US012292677B2

(12) United States Patent
Hirahara

(10) Patent No.: US 12,292,677 B2
(45) Date of Patent: May 6, 2025

(54) LIGHT SOURCE DEVICE AND PROJECTOR

(71) Applicant: Sharp NEC Display Solutions, Ltd., Tokyo (JP)

(72) Inventor: Sota Hirahara, Tokyo (JP)

(73) Assignee: Sharp NEC Display Solutions, Tokyo (JP)

( * ) Notice: Subject to any disclaimer, the term of this patent is extended or adjusted under 35 U.S.C. 154(b) by 0 days.

(21) Appl. No.: 18/281,853

(22) PCT Filed: Mar. 17, 2021

(86) PCT No.: PCT/JP2021/010813
§ 371 (c)(1),
(2) Date: Sep. 13, 2023

(87) PCT Pub. No.: WO2022/195761
PCT Pub. Date: Sep. 22, 2022

(65) Prior Publication Data
US 2024/0160094 A1 May 16, 2024

(51) Int. Cl.
*G03B 21/20* (2006.01)
(52) U.S. Cl.
CPC .......... *G03B 21/204* (2013.01); *G03B 21/208* (2013.01)
(58) Field of Classification Search
CPC .............. G03B 21/14–147; G03B 21/20–2086
See application file for complete search history.

(56) References Cited

U.S. PATENT DOCUMENTS

| 9,310,622 | B2 * | 4/2016 | Egawa | F21S 10/007 |
| 2014/0232992 | A1 | 8/2014 | Egawa | |
| 2015/0029475 | A1 | 1/2015 | Shimizu et al. | |

FOREIGN PATENT DOCUMENTS

| JP | 2003-121777 | A | 4/2003 |
| JP | 2013-171172 | A | 9/2013 |
| JP | 2014-163974 | A | 9/2014 |
| JP | 2014-203032 | A | 10/2014 |
| JP | 2015-060092 | A | 3/2015 |
| JP | 2015-184401 | A | 10/2015 |

(Continued)

OTHER PUBLICATIONS

International Search Report (Isr) (PCT Form PCT/ISA/210), in PCT/JP2021/010813, dated May 18, 2021.

*Primary Examiner* — Jason M Han
(74) *Attorney, Agent, or Firm* — McGinn IP Law Group, PLLC

(57) ABSTRACT

A light source device includes: a first laser light source which emits first laser light; and a diffusion element which is provided on an optical path of the first laser light and diffuses the light, wherein the diffusion element includes: a first lens array in which a plurality of first lens elements that divide the first laser light into a plurality of light fluxes are arranged; and a second lens array in which a plurality of second lens elements that emit the light fluxes incident via the plurality of first lens elements toward an image formation plane are arranged, wherein the first lens array is disposed on an incidence surface of the diffusion element, wherein the second lens array is disposed on an emission surface of the diffusion element, and wherein at least two second lens elements among the plurality of second lens elements form light source images having different sizes in different regions on the image formation plane.

7 Claims, 11 Drawing Sheets

(56) References Cited

FOREIGN PATENT DOCUMENTS

| JP | 2016-186566 A | 10/2016 |
| JP | 2016-206413 A | 12/2016 |
| JP | 2017-037175 A | 2/2017 |
| JP | 2019-128493 A | 8/2019 |
| JP | 2019-158914 A | 9/2019 |
| JP | 2020-008722 A | 1/2020 |

\* cited by examiner

LIGHT SOURCE DEVICE AND PROJECTOR

TECHNICAL FIELD

The present invention relates to a light source device and a projector.

BACKGROUND ART

In a projector that modulates laser light to form an image, spot-like noise called speckle occurs in a projected image. In order to reduce the speckle noise, it is common to arrange a diffusion plate on an optical path of the laser light.

Patent Document 1 describes a light source device in which a transmissive light diffusion element is disposed on an optical path of laser light. In the technology described in Patent Document 1, the light diffusion element has a rotatable circular substrate and a light diffusion layer provided on a first main surface of the substrate. The light diffusion layer includes a plurality of diffusion regions arranged in a circumferential direction, and diffusion properties of adjacent diffusion regions are different from each other. As the substrate is rotated, the laser light is sequentially incident on each of the diffusion regions, so that a diffusion angle of the light that has passed through the light diffusion element changes over time. Thus, since the speckle noise of the projected image changes over time, an observer observes an image on which the speckle noise is superimposed over time. As a result, Patent Document 1 describes that a good image with reduced speckle noise can be provided.

CITATION LIST

Patent Document

[Patent Document 1]
 Japanese Unexamined Patent Application, First Publication No. 2014-163974

SUMMARY OF INVENTION

Technical Problem

However, in the light source device described in Patent Document 1, since a mechanism for rotating the substrate of the light diffusion element, and the like is required, the device becomes large-scaled and the device cost increases.

In view of the above points, an object of the present invention is to provide a light source device and a projector capable of curbing an increase in size of the device and reducing speckle noise with a simple configuration.

Technical Problem

One aspect of the present invention is a light source device including: a first laser light source which emits first laser light; and a diffusion element which is provided on an optical path of the first laser light and diffuses the light, wherein the diffusion element includes: a first lens array in which a plurality of first lens elements that divide the first laser light into a plurality of light fluxes are arranged; and a second lens array in which a plurality of second lens elements that emit the light fluxes incident via the plurality of first lens elements toward an image formation plane are arranged, wherein the first lens array is disposed on an incidence surface of the diffusion element, wherein the second lens array is disposed on an emission surface of the diffusion element, and wherein at least two second lens elements among the plurality of second lens elements form light source images having different sizes in different regions on the image formation plane.

One aspect of the present invention is a projector including: the light source device; a light modulation part which modulates the light emitted from the light source device to form an image; and a projection lens which projects the image.

Advantageous Effects of Invention

According to the present invention, it is possible to curb an increase in size of the device and to reduce the speckle noise with a simple configuration.

DESCRIPTION OF EMBODIMENTS

Hereinafter, embodiments of a light source device and a projector according to the present invention will be described with reference to the drawings.

First Embodiment

Figure 1:
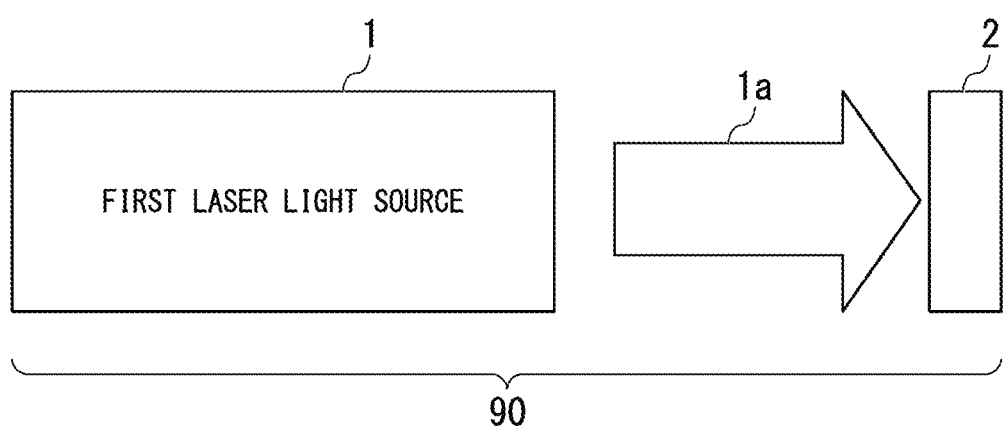
FIG. 1 is a block diagram showing an example of a configuration of a light source device according to a first embodiment.

FIG. 1 is a block diagram showing an example of a configuration of a light source device 90 according to a first embodiment.

In the example shown in FIG. 1, the light source device 90 includes a first laser light source 1 and a diffusion element 2. The first laser light source 1 emits laser light 1a. The diffusion element 2 is provided on an optical path of the laser light 1a and diffuses the light.

Figure 2:
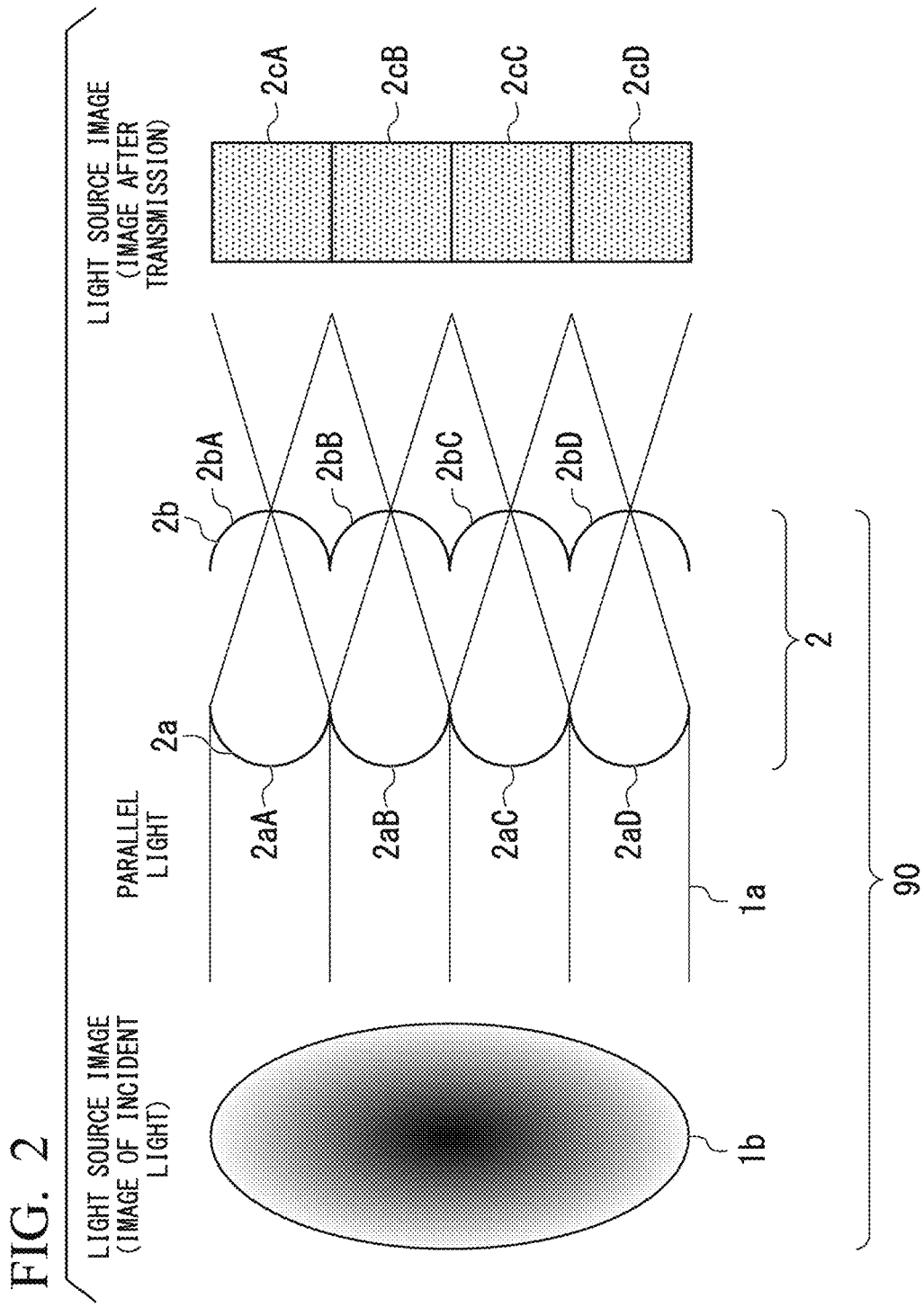
FIG. 2 is a schematic diagram showing a specific configuration of a diffusion element according to a reference example.

FIG. 2 is a schematic diagram showing a specific configuration of the diffusion element 2 according to a reference example.

In the example shown in FIG. 2, the diffusion element 2 includes a first lens array 2a disposed on an incidence surface of the diffusion element 2 and a second lens array 2b disposed on an emission surface of the diffusion element 2. A plurality of first lens elements (cells) 2aA, 2aB, 2aC, and 2aD that divide the laser light 1a into a plurality of light fluxes are arranged in the first lens array 2a. A plurality of second lens elements (cells) 2bA, 2bB, 2bC, and 2bD that emit the light fluxes incident via the plurality of first lens elements (cells) 2aA, 2aB, 2aC, and 2aD toward an image formation plane are arranged in the second lens array 2b.

In the example shown in FIG. 2, the laser light 1a incident on the plurality of first lens elements 2aA, 2aB, 2aC, and 2aD from a light source image (an image of incident light) 1b is a parallel light flux. Furthermore, each of the plurality of second lens elements 2bA, 2bB, 2bC and 2bD faces each of the plurality of first lens elements 2aA, 2aB, 2aC and 2aD. Specifically, an optical axis of each of the plurality of second lens elements 2bA, 2bB, 2bC, and 2bD is disposed on an optical axis of the light flux incident on each of the plurality of first lens elements 2aA, 2aB, 2aC, and 2aD.

That is, the optical axis of the second lens element 2bA is disposed on the optical axis of the light flux incident on the first lens element 2aA, the optical axis of the second lens element 2bB is disposed on the optical axis of the light flux incident on the first lens element 2aB, the optical axis of the second lens element 2bC is disposed on the optical axis of the light flux incident on the first lens element 2aC, and the optical axis of the second lens element 2bD is disposed on the optical axis of the light flux entering the first lens element 2aD.

Therefore, in the example shown in FIG. 2, the plurality of second lens elements 2bA, 2bB, 2bC, and 2bD respectively form light source images (images after transmission) 2cA, 2cB, 2cC, and 2cD having the same size in different regions on the image formation plane. That is, the size of the light source image 2cA formed by the second lens element 2bA, the size of the light source image 2cB formed by the second lens element 2bB, the size of the light source image 2cC formed by the second lens element 2bC, and the size of the light source image 2cD formed by the second lens element 2bD are equal to each other.

Figure 3:
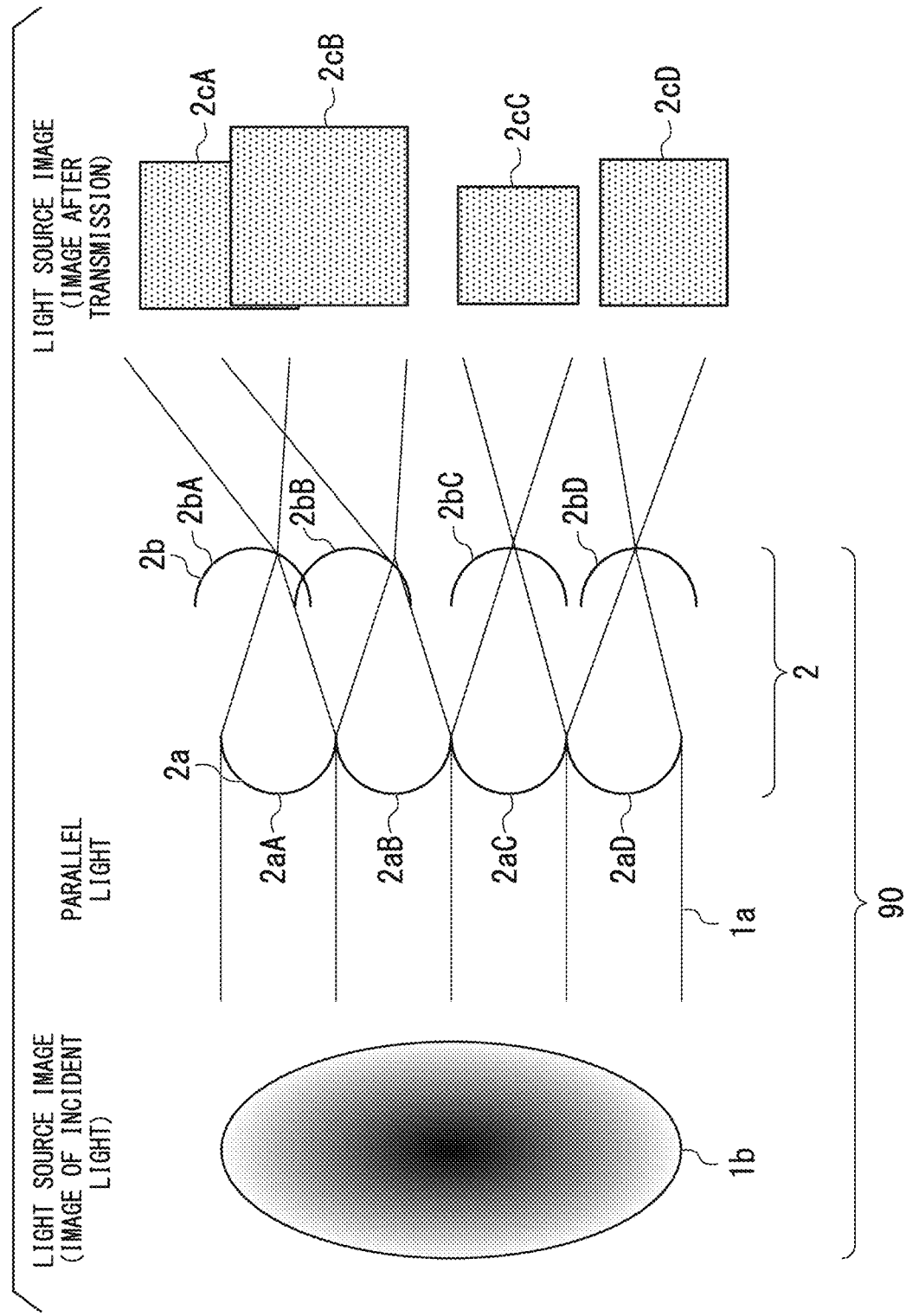
FIG. 3 is a schematic diagram showing an example of a specific configuration of the diffusion element shown in FIG. 1.

FIG. 3 is a schematic diagram showing an example of a specific configuration of the diffusion element 2 shown in FIG. 1.

In the example shown in FIG. 3, similarly to the example shown in FIG. 2, the diffusion element 2 includes the first lens array 2a disposed on the incidence surface of the diffusion element 2 and the second lens array 2b disposed on the emission surface of the diffusion element 2. The plurality of first lens elements (cells) 2aA, 2aB, 2aC, and 2aD that divide the laser light 1a into a plurality of light fluxes are arranged in the first lens array 2a. The plurality of second lens elements (cells) 2bA, 2bB, 2bC, and 2bD that emit the light fluxes incident via the plurality of first lens elements (cells) 2aA, 2aB, 2aC, and 2aD toward the image formation plane are arranged in the second lens array 2b.

In the example shown in FIG. 3, similarly to the example shown in FIG. 2, the laser light 1a incident on the plurality of first lens elements 2aA, 2aB, 2aC, and 2aD from the light source image (the image of incident light) 1b is a parallel light flux.

On the other hand, in the example shown in FIG. 3, unlike the example shown in FIG. 2, the optical axis of each of the plurality of second lens elements 2bA, 2bB, 2bC, and 2bD is disposed at a position shifted from the optical axis of the light flux incident on each of the plurality of first lens elements 2aA, 2aB, 2aC, and 2aD.

That is, in the example shown in FIG. 3, the optical axis of the second lens element 2bA is disposed at a position shifted from the optical axis of the light flux incident on the first lens element 2aA, the optical axis of the second lens element 2bB is disposed at a position shifted from the optical axis of the light flux incident on the first lens element 2aB, the optical axis of the second lens element 2bC is disposed at a position shifted from the optical axis of the light flux incident on the first lens element 2aC, and the optical axis of the second lens element 2bD is disposed at a position shifted from the optical axis of the light flux incident on the first lens element 2aD.

Therefore, in the example shown in FIG. 3, the plurality of second lens elements 2bA, 2bB, 2bC, and 2bD respectively form the light source images (the images after transmission) 2cA, 2cB, 2cC, and 2cD having different sizes in different regions on the image formation plane. That is, the size of the light source image 2cA formed by the second lens element 2bA, the size of the light source image 2cB formed by the second lens element 2bB, the size of the light source image 2cC formed by the second lens element 2bC, and the size of the light source image 2cD formed by the second lens element 2bD are different from each other.

As shown in FIG. 3, the reason why the light source images 2cA, 2cB, 2cC, and 2cD having different sizes are formed in different regions on the image formation plane is because positions at which the plurality of light fluxes divided by the first lens array 2a are condensed on the second lens array 2b are different positions for each of the plurality of second lens elements 2bA, 2bB, 2bC, and 2bD.

In another example, all optical axes of the plurality of second lens elements 2bA, 2bB, 2bC, 2bD may not be disposed at the positions shifted from the optical axes of the light fluxes incident on each of the plurality of first lens elements 2aA, 2aB, 2aC, and 2aD. When the optical axes of some (the second lens elements) of at least two of the plurality of second lens elements 2bA, 2bB, 2bC, and 2bD are disposed at the positions shifted from the optical axes of the light fluxes incident on the first lens elements corresponding to the some of the second lens elements, the at least two second lens elements can form light source images having different sizes in different regions on a coupling plane.

Figure 4:
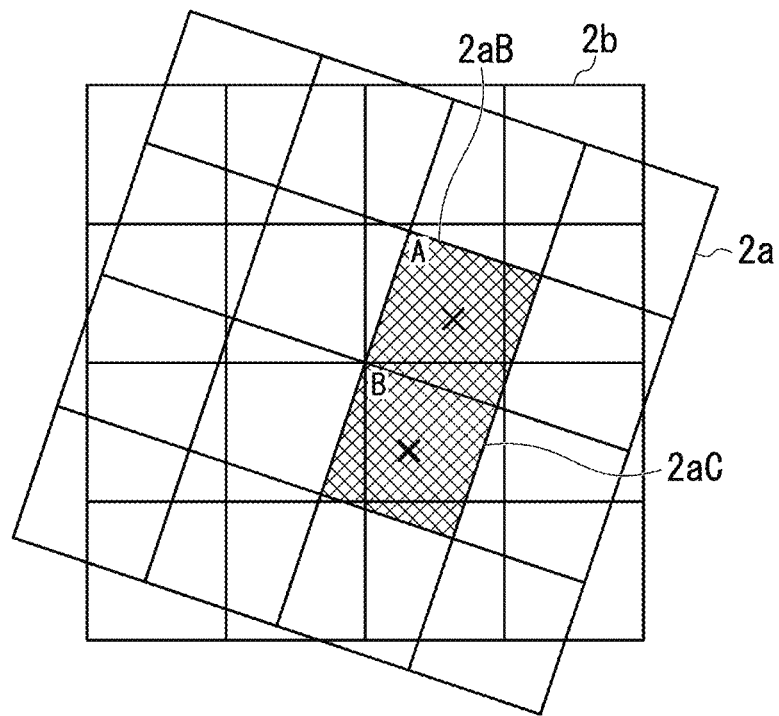
FIG. 4 is a diagram showing an example of a method for arranging optical axes of a plurality of second lens elements at positions shifted from optical axes of light fluxes incident on a plurality of first lens elements.

FIG. 4 is a diagram showing an example of a method for arranging the optical axis of each of the plurality of second lens elements 2bA, 2bB, 2bC, 2bD, . . . at a position shifted from the optical axis of the light flux incident on each of the plurality of first lens elements 2aA, 2aB, 2aC, 2aD, . . . .

In the example shown in FIG. 4, the optical axis of each of the plurality of second lens elements 2bA, 2bB, 2bC, and 2bD is disposed at the position shifted from the optical axis of the light flux incident on each of the plurality of first lens elements 2aA, 2aB, 2aC, and 2aD by rotating the first lens array 2a clockwise with respect to the second lens array 2b.

In the example shown in FIG. 4, the light transmitted through a position A indicated by "X" in the first lens element (cell) 2aB is condensed, for example, on a right lower portion of the second lens array 2b by the first lens element (cell) 2aB. Further, the light transmitted through a position B indicated by "X" in the first lens element (cell) 2aC is condensed, for example, on a left lower portion of the second lens array 2b by the first lens element (cell) 2aC.

In order to rotate the first lens array 2a clockwise with respect to the second lens array 2b, only the first lens array 2a may be rotated, only the second lens array 2b may be rotated, or both the first lens array 2a and the second lens array 2b may be rotated.

Figure 5:
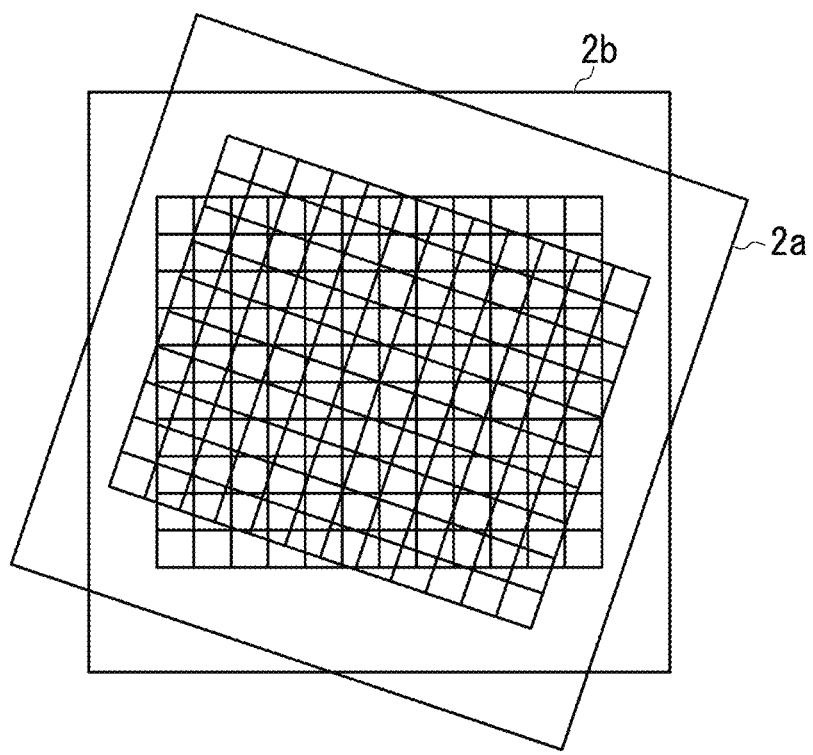
FIG. 5 is a diagram of a first lens array and a second lens array seen from in front of the first lens array and the second lens array.
Figure 6:
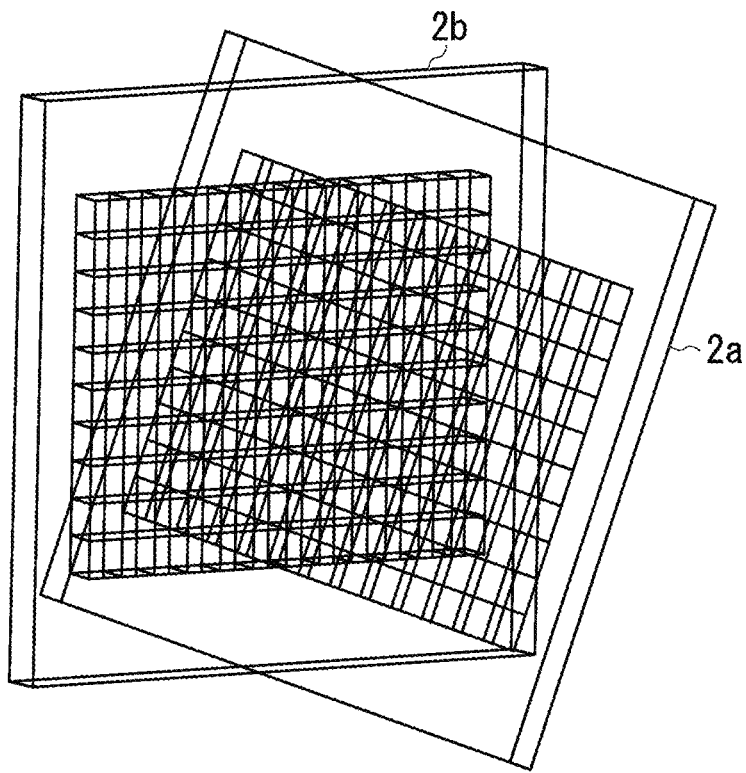
FIG. 6 is a diagram of the first lens array and the second lens array seen from above and to the left in front of the first lens array and the second lens array.
Figure 7:
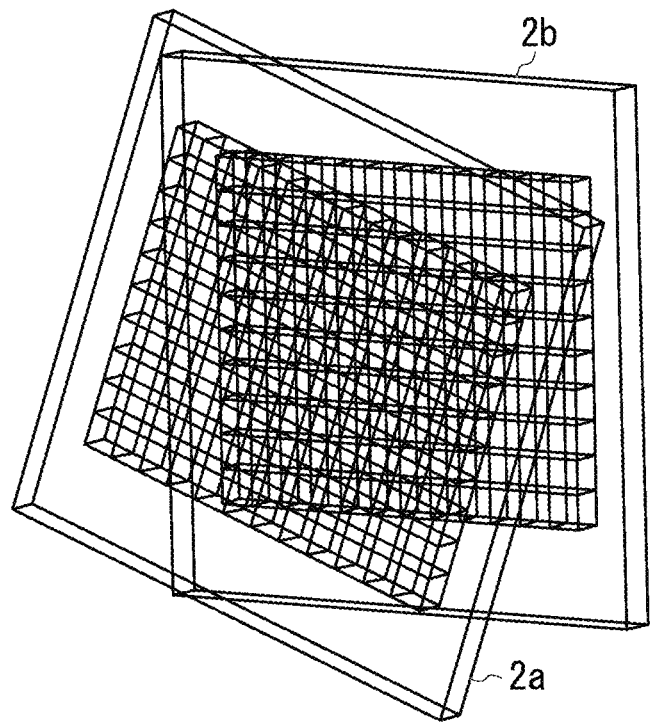
FIG. 7 is a diagram of the first lens array and the second lens array seen from above and to the right in front of the first lens array and the second lens array.

FIGS. 5 to 7 are diagrams showing another example of the method for arranging the optical axis of each of the plurality of second lens elements 2bA, 2bB, 2bC, 2bD, . . . at the position shifted from the optical axis of the light flux incident on each of the plurality of first lens elements 2aA, 2aB, 2aC, 2aD, . . . .

Specifically, FIG. 5 is a diagram of the first lens array 2a and the second lens array 2b as seen from a direction of the optical axis of the light flux incident on each of the plurality of first lens elements 2aA, 2aB, 2aC, 2aD, . . . of the first lens array 2a (a diagram of the first lens array 2a and the second lens array 2b seen from the front side of the first lens array 2a and the second lens array 2b). FIG. 6 is a diagram of the first lens array 2a and the second lens array 2b as seen from the left front side and the upper side of the first lens array 2a and the second lens array 2b. FIG. 7 is a diagram of the first lens array 2a and the second lens array 2b as seen from the right front side and the upper side of the first lens array 2a and the second lens array 2b.

In the examples shown in FIGS. 5 to 7, the first lens array 2a and the second lens array 2b are formed on different glass substrates, but in another example, the first lens array 2a may be formed on an incident side surface of one glass substrate, and the second lens array 2b may be formed on an emission side surface of the glass substrate.

In the example shown in FIG. 3, as described above, since the optical axis of each of the plurality of second lens elements 2bA, 2bB, 2bC, and 2bD is disposed at the position shifted from the optical axis of the light flux incident on each of the plurality of first lens elements 2aA, 2aB, 2aC, and 2aD, in the optical axis of each of the plurality of second lens elements 2bA, 2bB, 2bC, and 2bD, randomness is higher than that in the example shown in FIG. 2 in which the optical axis thereof is disposed on the optical axis of the light flux incident on each of the plurality of first lens elements 2aA, 2aB, 2aC, and 2aD, and the effect of reducing speckle noise is higher.

Moreover, in the example shown in FIG. 3, the first laser light source 1 is, for example, a laser diode (LD). A light emission point of the LD is small, and a light intensity distribution thereof follows Gaussian distribution. The laser light 1a emitted from the elliptical light source image 1b is pseudo parallel light and is a so-called Gaussian beam.

When the diffusion element 2 is seen in a direction perpendicular to the incidence surface of the diffusion element 2 (refer to, for example, FIGS. 4 and 5), each of the plurality of first lens elements (cells) 2aA, 2aB, 2aC, and 2aD of the first lens array 2a has a rectangular shape. Moreover, when the diffusion element 2 is seen from a direction perpendicular to the emission surface of the diffusion element 2, each of the plurality of second lens elements (cells) 2bA, 2bB, 2bC, and 2bD of the second lens array 2b has a rectangular shape.

Therefore, FIG. 3 shows rectangular light source images (images after transmission) 2cA, 2cB, 2cC, and 2cD.

In other words, the diffusion element 2 can be called an element that converts an elliptical light source image (an image of incident light) 1b into a plurality of rectangular light source images (images after transmission) 2cA, 2cB, 2cC, and 2cD. The light source images 2cA, 2cB, 2cC, and 2cD are arranged at different positions and sizes on the image formation plane. It is possible to make the light intensity distribution in the entire light flux emitted from the light source images 2cA, 2cB, 2cC, and 2cD uniform by randomly arranging the rectangular light source images 2cA, 2cB, 2cC, and 2cD.

From the viewpoint of diffusing the laser light, the shapes of the cells and the light source images 2cA, 2cB, 2cC, and 2cD are not limited to the rectangular shapes.

In the example shown in FIG. 3, the second lens array 2b is disposed at a focal position of each of the plurality of first lens elements (cells) 2aA, 2aB, 2aC, and 2aD of the corresponding first lens array 2a. The first lens array 2a and the second lens array 2b diffuse the laser light 1a.

Figure 8:
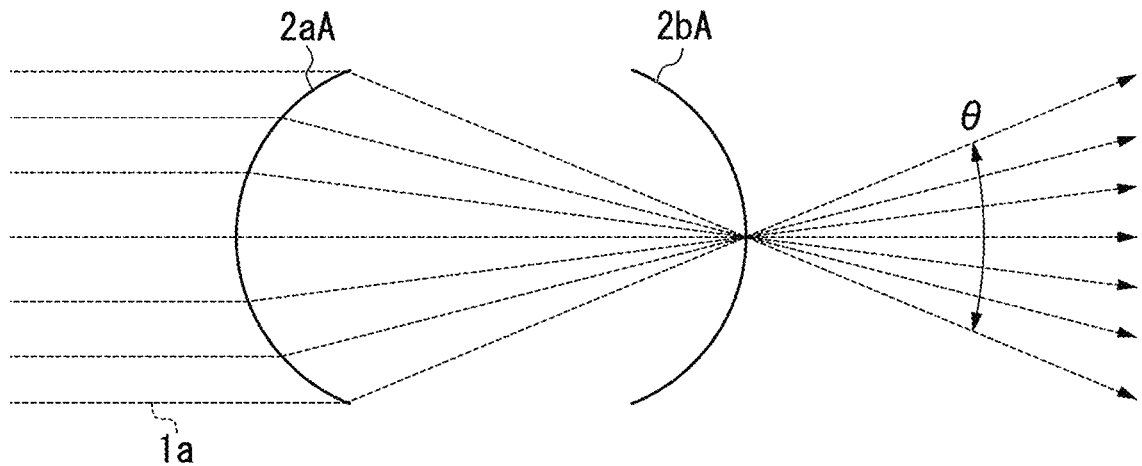
FIG. 8 is a diagram schematically showing a state in which the first lens elements of the first lens array and the second lens elements of the second lens array shown in FIG. 2 diffuse laser light.

FIG. 8 is a diagram schematically showing a state in which the first lens element 2aA of the first lens array 2a and the second lens element 2bA of the second lens array 2b shown in FIG. 2 diffuse the laser light 1a.

As shown in FIG. 8, the laser light 1a that is a parallel light flux is condensed by the first lens element 2aA of the first lens array 2a and is diffused after passing through the second lens element 2bA of the second lens array 2b. Here, an angle formed by a light ray that has passed through the uppermost end of the first lens element 2aA and a light ray that has passed through the lowermost end of the first lens element 2aA is referred to as a diffusion angle $\theta$. Since optical path lengths of the light rays within a range of the diffusion angle $\theta$ are different from each other, a phase difference occurs between the light rays according to the difference in the optical path lengths. The phase difference makes it possible to reduce the speckle noise.

As a curvature of a lens surface of each of the first lens element 2aA and the second lens element 2bA becomes larger (as a curvature radius becomes smaller), the diffusion angle $\theta$ increases. As the diffusion angle $\theta$ increases, the difference in the optical path lengths increases, and thus the effect of reducing the speckle noise increases. Also, as the number of lens elements 2aA, 2aB, 2aC, 2aD, 2bA, 2bB, 2bC, and 2bD that divide the laser light 1a increases, the effect of diffusing the laser light 1a increases. As a result, the effect of reducing the speckle noise increases. Thus, in order to increase the effect of reducing the speckle noise, it is desirable to increase the diffusion angle $\theta$ or to increase the number of lens elements 2aA, 2aB, 2aC, and 2aD of the first lens array 2a and lens elements 2bA, 2bB, 2bC, and 2bD of the second lens array 2b. When the diffusion angle $\theta$ is increased, a size of an optical system in a next stage may increase, and thus it is desirable to provide a condenser lens or the like on the optical path of the laser light 1a that has passed through the diffusion element 2.

According to the light source device 90 of the first embodiment, the speckle noise can be reduced by diffusing the laser light 1a using the diffusion element 2 having the lens arrays 2a and 2b on both the incidence surface and the emission surface. The diffusion element 2 can be realized with a simpler configuration than a light diffusion element having a rotating mechanism. In this way, it is possible to curb an increase in the size of the light source device 90 and to reduce the speckle noise with a simple configuration.

Second Embodiment

A second embodiment of the light source device and the projector of the present invention will be described below.

The light source device 90 of the second embodiment is configured in the same manner as the light source device 90 of the first embodiment described above, except for the points which will be described below. Therefore, according to the light source device 90 of the second embodiment, effects similar to those in the light source device 90 of the above-described first embodiment can be obtained, except for the points described below.

Figure 9:
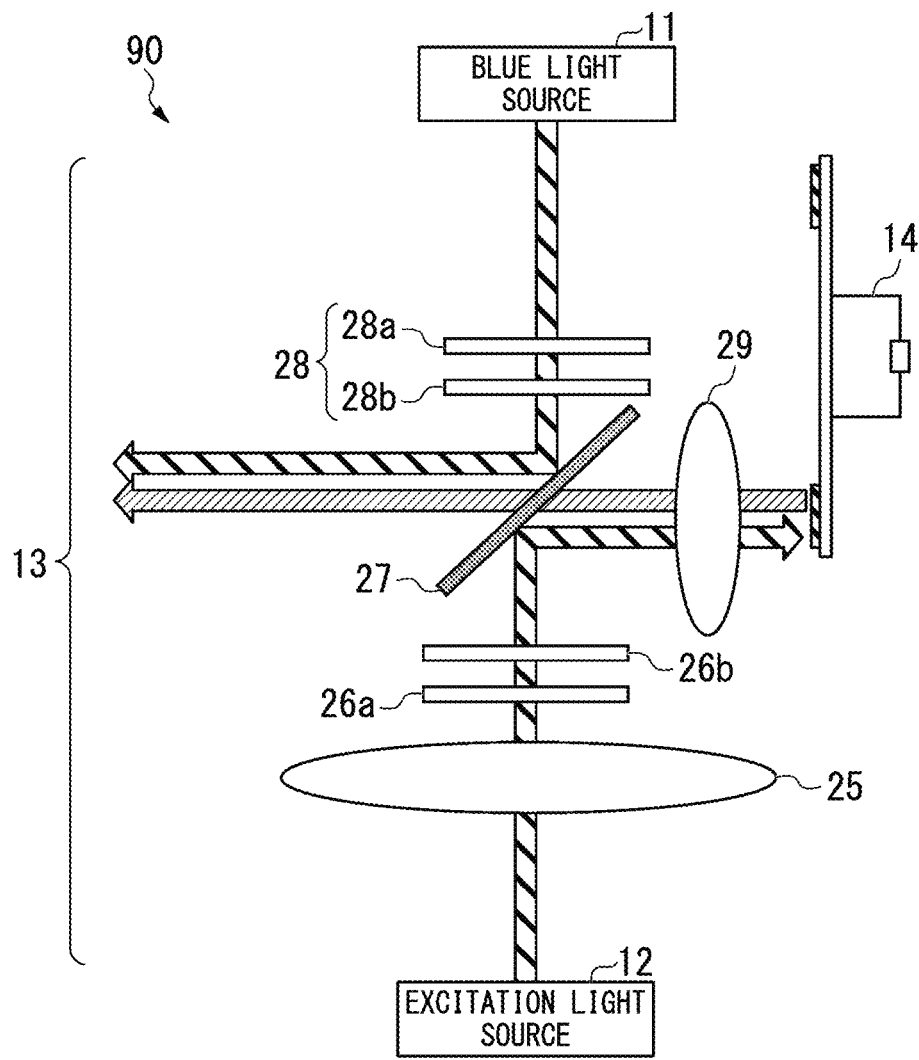
FIG. 9 is a diagram showing an example of a light source device according to a second embodiment

FIG. 9 is a diagram showing an example of the light source device 90 of the second embodiment.

In the example shown in FIG. 9, the light source device 90 includes a blue light source 11, an excitation light source 12, an optical member 13, and a fluorescent substance part 14.

The blue light source 11 functions as a first laser light source that emits first laser light. The blue light source 11 is configured of a laser module having a plurality of LD chips that emit blue LD light (linearly polarized light). Emitted light from each of the LD chips is a pseudo parallel light flux.

The excitation light source 12 functions as a second laser light source that emits a second laser light. The excitation light source 12 is configured of a laser module having a plurality of LD chips that emit blue LD light (linearly polarized light). Emitted light from each LD chip is a pseudo parallel light flux.

The fluorescent substance part 14 receives second laser light emitted by the excitation light source 12 and emits fluorescent light. Specifically, the fluorescent substance part 14 is excited by the blue LD light emitted by the excitation light source 12 and emits yellow fluorescent light.

For example, a fluorescent substance wheel can be used as the fluorescent substance part 14. The fluorescent substance wheel has a rotary substrate. A fluorescent layer containing a fluorescent substance that emits yellow fluorescent light is formed in a circumferential direction on one surface of the rotary substrate. A reflection member that reflects the fluorescent light incident from the fluorescent layer toward the fluorescent layer is provided between the fluorescent layer and the rotary substrate. The reflection member may be omitted by configuring the rotary substrate with a metal material.

The optical member 13 includes a reduction optical system 25, fly-eye lenses 26a and 26b, a dichroic mirror 27, a diffusion element 28 and a condenser lens 29.

The diffusion element 28 is provided on the optical path of the first laser light (the blue LD light) emitted by the blue light source 11 and diffuses the light. The diffusion element 28 includes a first lens array 28a disposed on an incidence surface of diffusion element 28 and a second lens array 28b disposed on an emission surface of diffusion element 28. A plurality of first lens elements (cells) that divide the first laser light (the blue LD light) emitted by the blue light source 11 into a plurality of light fluxes are arranged in the first lens array 28a. A plurality of second lens elements (cells) that emit the light fluxes incident via the plurality of first lens elements (cells) toward an image formation plane are arranged in the second lens array 28b.

Similarly to the diffusion element 2 shown in FIG. 3, in the diffusion element 28 shown in FIG. 9, since the optical axis of each of the plurality of second lens elements (cells) of the second lens array 28b is disposed at a position shifted from the optical axis of the light flux incident on each of the plurality of first lens elements (cells) of the first lens array 28a, the plurality of second lens elements (cells) of the second lens array 28b respectively form light source images having different sizes in different regions on the image formation plane. In another example of the diffusion element 28, all the optical axes of the plurality of second lens elements (cells) of the second lens array 28b may not be disposed at positions shifted from the optical axes of the light fluxes incident on each of the plurality of first lens elements (cells) of the first lens array 28a.

The blue LD light (the first laser light) emitted by the blue light source 11 is incident on one surface of the dichroic mirror 27 via the diffusion element 28. The blue LD light (excitation light) emitted by the excitation light source 12 is incident on the other surface of the dichroic mirror 27 via the reduction optical system 25 and fly-eye lenses 26a and 26b.

The reduction optical system 25 reduces a light flux diameter of the excitation light emitted by the excitation light source 12. It is possible to make the optical system in the stage after the reduction optical system 25 smaller by reducing the light flux diameter. The fly-eye lenses 26a and 26b are light homogenizing elements for making an irradiation surface of the fluorescent substance part 14 have a uniform illuminance distribution.

The dichroic mirror 27 has a property of reflecting light in a blue wavelength range and transmitting light in the other wavelength ranges in visible wavelengths. The dichroic mirror 27 reflects the excitation light with a reflection angle of 45 degrees. The excitation light reflected by the dichroic mirror 27 is radiated to the fluorescent substance part 14 via the condenser lens 29.

The fluorescent substance part 14 receives the excitation light and emits yellow fluorescent light toward the condenser lens 29. The yellow fluorescent light emitted by the fluorescent substance part 14 is incident on the other surface of the dichroic mirror 27 via the condenser lens 29.

The condenser lens 29 has the role of condensing the excitation light (the second laser light) on the irradiation surface of the fluorescent substance part 14 and also the role of converting the yellow fluorescent light from the fluorescent substance part 14 into pseudo parallel light.

The dichroic mirror 27 transmits the yellow fluorescent light emitted by the fluorescent substance part 14 and reflects the blue LD light (the first laser light) emitted by the blue light source 11 in a transmission direction of the yellow fluorescent light. That is, the dichroic mirror 27 functions as a color light combining part that combines the yellow fluorescent light and the blue LD light (the first laser light) into one optical path. The light color-combined by the dichroic mirror 27 is output light (white) of the light source device 90 of the second embodiment.

The condenser lens 29 is disposed between the fluorescent substance part 14 and the dichroic mirror 27 that functions as a color light combining part.

The diffusion element 28 is disposed between the blue light source 11 (the first laser light source) and the dichroic mirror 27 that functions as a color light combining part (more specifically, on the optical path of the first laser light).

Figure 10:
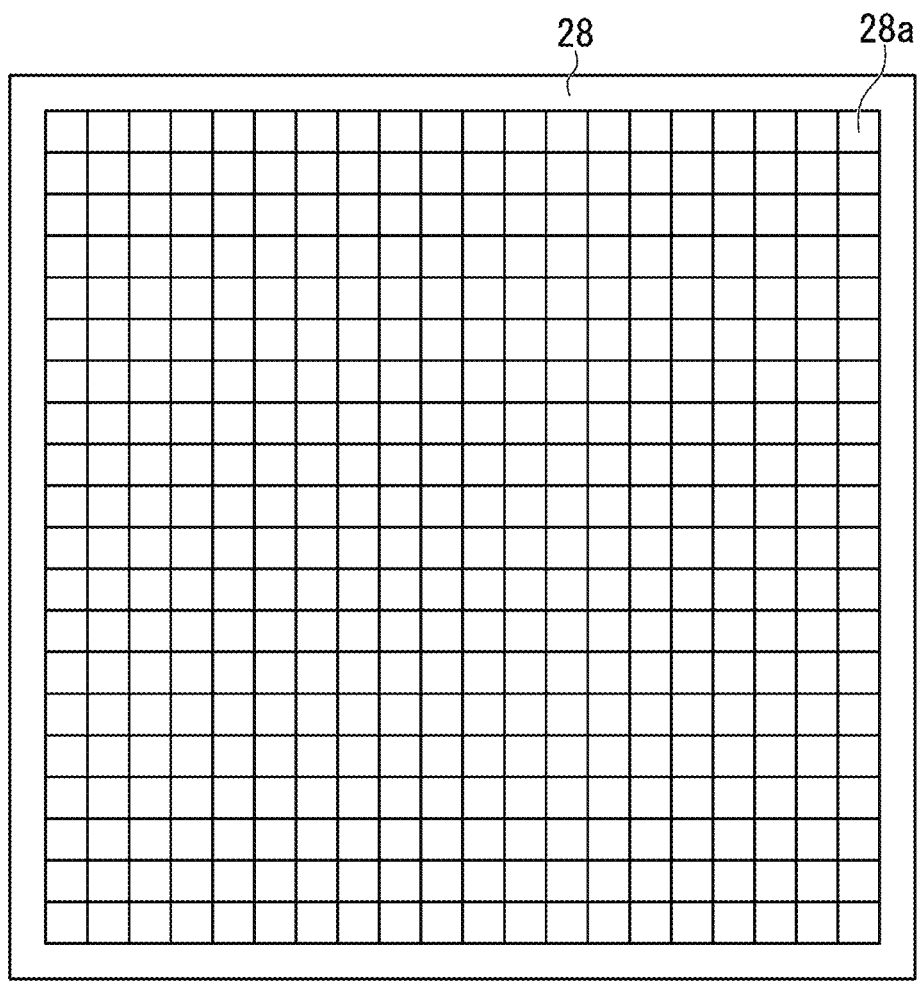
FIG. 10 is a diagram showing an example of a first lens array (a micro-lens array) disposed on an incidence surface of a diffusion element shown in FIG. 9.

FIG. 10 is a diagram showing an example of the first lens array 28a (a micro-lens array) disposed on the incidence surface of the diffusion element 28 shown in FIG. 9.

In the example shown in FIG. 10, the first lens array 28a disposed on the incidence surface of the diffusion element 28 is partitioned into a lattice and includes a plurality of rectangular cells (the first lens elements). That is, the first lens array 28a in which a plurality of rectangular first lens elements are disposed in a matrix is disposed on the incidence surface of the diffusion element 28.

Also, although not shown in the drawing when implemented with a single glass substrate, a plurality of rectangular second lens elements may also be formed on the emission surface of the diffusion element 28 at positions obtained by rotating the plurality of rectangular first lens elements.

The first lens array 28a disposed on the incidence surface of the diffusion element 28 corresponds to the first lens array 2a of the diffusion element 2 of the light source device 90 according to the first embodiment, and the second lens array 28b disposed on the emission surface of the diffusion element 28 corresponds to the second lens array 2b of the diffusion element 2 of the light source device 90 according to the first embodiment.

In the example shown in FIG. 9, the blue light source 11 (the first laser light source) includes a plurality of blue LD chips. The blue LD light (the first laser light) emitted by each of the blue LD chips is incident on different regions on the incidence surface of the diffusion element 28 without overlapping each other.

In the example shown in FIG. 9, similarly to the example shown in FIG. 3, the blue LD light emitted from one blue LD chip is divided into a plurality of light fluxes by being incident on a plurality of lens elements of the first lens array 28a. Each of the plurality of lens elements of the second lens array 28b emits light fluxes incident from the lens elements of the corresponding first lens array 28a toward the image formation plane, and forms rectangular light source images in different regions on the image formation plane. The blue LD light that has passed through each of the plurality of lens elements of the second lens array 28b is diffused at a diffusion angle θ as in the example shown in FIG. 8.

Third Embodiment

A light source device and a projector according to a third embodiment of the present invention will be described below.

The light source device 90 of the third embodiment is configured in the same manner as the light source device 90 of the second embodiment described above, except for the points described below. Therefore, according to the light source device 90 of the third embodiment, effects similar to those of the light source device 90 of the above-described second embodiment can be achieved, except for the points described below.

Figure 11:
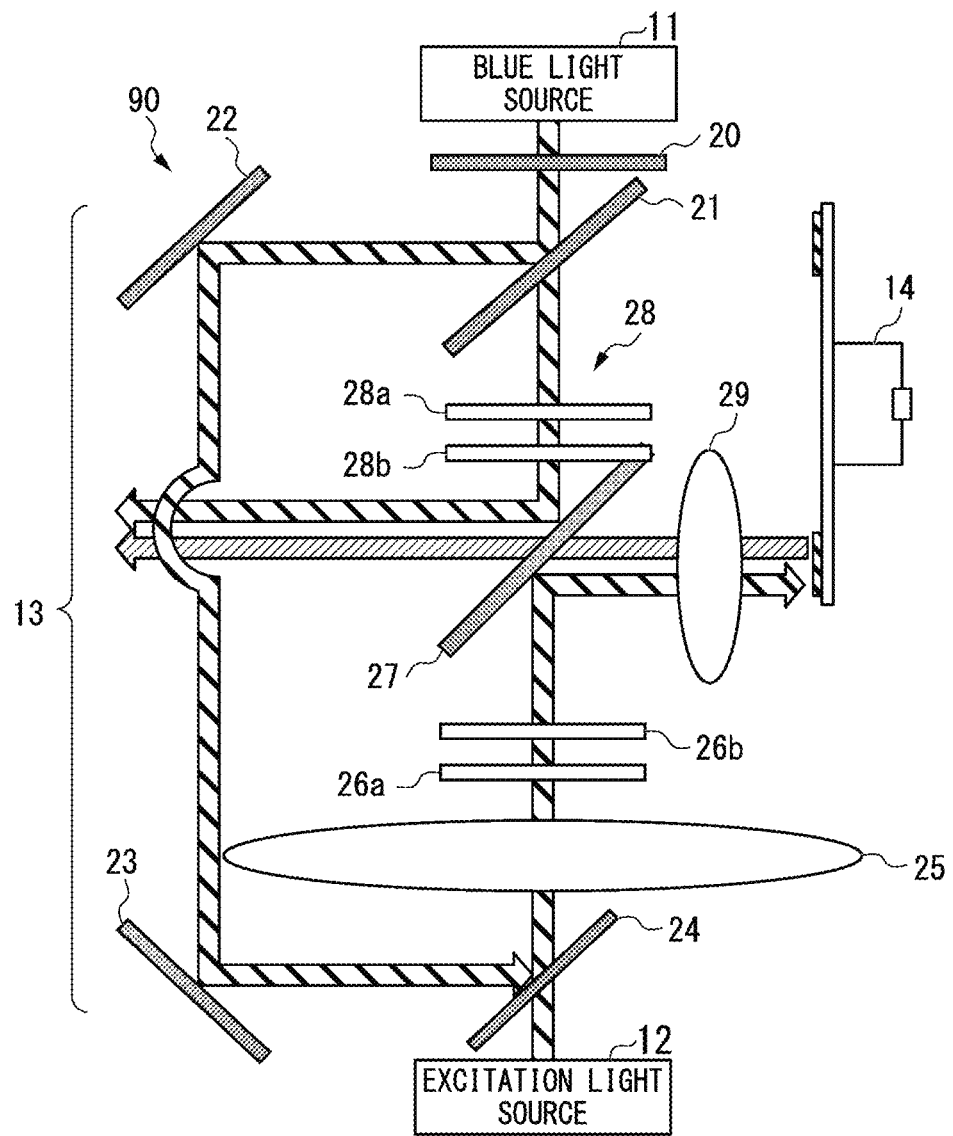
FIG. 11 is a diagram schematically showing an example of a light source device according to a third embodiment.

FIG. 11 is a diagram schematically showing an example of the light source device 90 of the third embodiment. In FIG. 11, optical paths and optical elements are schematically shown, and sizes and shapes thereof may differ from actual ones. For example, for the sake of convenience, an optical path jumps over another optical path, but in reality, each of the optical paths is linear and intersects in a spatially separated state.

In the example shown in FIG. 11, similarly to the example shown in FIG. 9, the light source device 90 includes a blue light source 11, an excitation light source 12, an optical member 13, and a fluorescent substance part 14.

The optical member 13 includes a retardation plate 20, a polarization beam splitter 21, mirrors 22 and 23, a light integration part 24, a reduction optical system 25, fly-eye lenses 26a and 26b, a dichroic mirror 27, a diffusion element 28, and a condenser lens 29.

The blue LD light (the linearly polarized light) emitted by the blue light source 11 is incident on the polarization beam splitter 21 via the retardation plate 20. The retardation plate 20 is an element that imparts a phase difference to two orthogonal polarized light components to change a state of incident polarized light. As the retardation plate 20, for example, a crystal plate such as quartz, a half-wavelength plate, a quarter-wavelength plate, or the like can be used. The blue LD light that has passed through the retardation plate 20 contains S-polarized light (first polarized light) and P-polarized light (second polarized light).

The polarization beam splitter 21 is disposed at an angle of 45 degrees with respect to the optical axis of the blue light source 11, and is configured to reflect the S-polarized light (the first polarized light) and to transmit the P-polarized light (the second polarized light). An angle of reflection for the S-polarized light is 45 degrees. Here, the angle of reflection is an angle between a normal to an incidence surface and a traveling direction of reflected light. The retardation plate 20 and the polarization beam splitter 21 are formed so that a division ratio between the S-polarized light and the P-polarized light is a desired value.

The retardation plate 20 and the polarization beam splitter 21 function as a dividing part that divides the blue LD light (the first laser light) emitted by the blue light source 11 into first divided light (the first polarized light, the S-polarized light) and second divided light (the second polarized light, the P-polarized light).

The S-polarized (the first divided light, first polarized light) blue LD light reflected by the polarization beam splitter 21 is incident on the light integration part 24 via the mirrors 22 and 23. The light integration part 24 integrates the S-polarized (the first divided light, the first polarized light) blue LD light and the blue LD light (the second laser light) emitted from the excitation light source 12 (the second laser light source) into one optical path.

For example, the excitation light source 12 may emit a plurality of spatially separated light fluxes in the same direction, and the mirror that is the light integration part 24 may be provided in a space that does not block each of the light fluxes in the optical path including the light fluxes. In this case, the mirror that is the light integration part 24 reflects the S-polarized blue LD light in the same direction as an emission direction of the excitation light source 12.

As another example, the light integration part 24 may be configured of a polarization beam splitter disposed at an angle of 45 degrees with respect to the optical axis of the excitation light source 12. In this case, the excitation light source 12 emits the P-polarized blue LD light. The polarization beam splitter (the light integration part 24) transmits the P-polarized blue LD light emitted by the excitation light source 12 and reflects the S-polarized blue LD light from the mirror 23 in the same direction as an emission direction of the P-polarized blue LD light.

In the example shown in FIG. 11, the integrated light integrated by the light integration part 24 is used as excitation light for exciting the fluorescent substance part 14. The integrated light from the light integration part 24 is incident on the first surface of the dichroic mirror 27 via the reduction optical system 25 and the fly-eye lenses 26a and 26b. The reduction optical system 25 reduces the light flux diameter of the integrated light from the light integration part 24. The fly-eye lenses 26a and 26b are light homogenizing elements for making the irradiation surface of the fluorescent substance part 14 have a uniform illuminance distribution.

The dichroic mirror 27 reflects the integrated light with a reflection angle of 45 degrees. The integrated light reflected by the dichroic mirror 27 is radiated to the fluorescent substance part 14 via the condenser lens 29.

The fluorescent substance part 14 receives the integrated light (the light integrated by the light integration part 24) that is excitation light, and emits yellow fluorescent light toward the condenser lens 29. The yellow fluorescent light emitted by the fluorescent substance part 14 is incident on the first surface of the dichroic mirror 27 via the condenser lens 29.

The condenser lens 29 has the role of condensing the integrated light (the light integrated by the light integration part 24) that is the excitation light on the irradiation surface of the fluorescent substance part 14, and also has the role of converting the yellow fluorescent light from the fluorescent substance part 14 into pseudo parallel light. The condenser lens 29 is disposed between the fluorescent substance part 14 and the dichroic mirror 27 that functions as a color light combining part.

The P-polarized (the second polarized light, the second divided light) blue LD light that has passed through the polarization beam splitter 21 is incident on a second surface (a surface opposite to the first surface) of the dichroic mirror 27 via the diffusion element 28.

The dichroic mirror 27 transmits the yellow fluorescent light incident on the first surface and reflects the blue LD light incident on the second surface in the transmission direction of the yellow fluorescent light. That is, the dichroic mirror 27 color-combines the blue LD light (the second divided light, the P-polarized light, the second polarized light) and yellow fluorescent light into one optical path. In other words, the dichroic mirror 27 functions as a color light combining part that color-combines the second divided light (the P-polarized light, the second polarized light) and the fluorescent light into one optical path. The light color-combined by the dichroic mirror 27 is output light (white) of the light source device 90 according to the third embodiment.

The diffusion element 28 is disposed on the optical path of the second divided light (the P-polarized light, the second polarized light) between the blue light source 11 (the first laser light source) and the dichroic mirror 27 that functions as a color light combining part. That is, the diffusion element 28 diffuses the second divided light (the P-polarized light, the second polarized light).

The diffusion element 28 includes a first lens array 28a disposed on the incidence surface of diffusion element 28 and a second lens array 28b disposed on the emission surface of diffusion element 28. A plurality of first lens elements (cells) that divide the P-polarized light (the second polarized light) contained in the first laser light (the blue LD light) emitted by the blue light source 11 into a plurality of light fluxes are disposed in the first lens array 28a. A plurality of second lens elements (cells) that emit the light fluxes incident through the plurality of first lens elements (cells) toward the image formation plane are disposed in the second lens array 28b.

Similarly to the diffusion element 2 shown in FIG. 3, in the diffusion element 28 shown in FIG. 11, since the optical axis of each of the plurality of second lens elements (cells) of the second lens array 28b is disposed at a position shifted from the optical axis of the light flux incident on each of the plurality of first lens elements (cells) of the first lens array 28a, the plurality of second lens elements (cells) of the second lens array 28b respectively forms light source images having different sizes in different regions on the image formation plane. In another example of the second diffusion element 28, all the optical axes of the plurality of second lens elements (cells) of the second lens array 28b may not be disposed at positions shifted from the optical axes of the light fluxes incident on each of the plurality of first lens elements (cells) of the first lens array 28a.

In the light source device 90 according to the third embodiment, in addition to the same effects as those in the light source device 90 according to the second embodiment, since some (the S-polarized light, the first polarized light, the first divided light) of the emitted light from the blue light source 11 can be diverted to the excitation light source 12 side, light utilization efficiency can be improved. Further, when the blue light source 11 and the excitation light source 12 are configured using a laser module having a plurality of LD chips, optimization of the number of LD chips of the blue light source 11 and the excitation light source 12 can be easily achieved. Further, it is possible to obtain output light with a desired tint by configuring the retardation plate 20 and the polarization beam splitter 21 so that the division ratio between the S-polarized light and the P-polarized light becomes a desired value.

Fourth Embodiment

A fourth embodiment of the light source device and projector of the present invention will be described below.

The light source device 90 according to the fourth embodiment is configured in the same manner as the light source device 90 according to the third embodiment described above, except for the points described below. Therefore, according to the light source device 90 according to the fourth embodiment, effects similar to those in the light source device 90 of the above-described third embodiment can be achieved, except for the points described below.

Figure 12A:
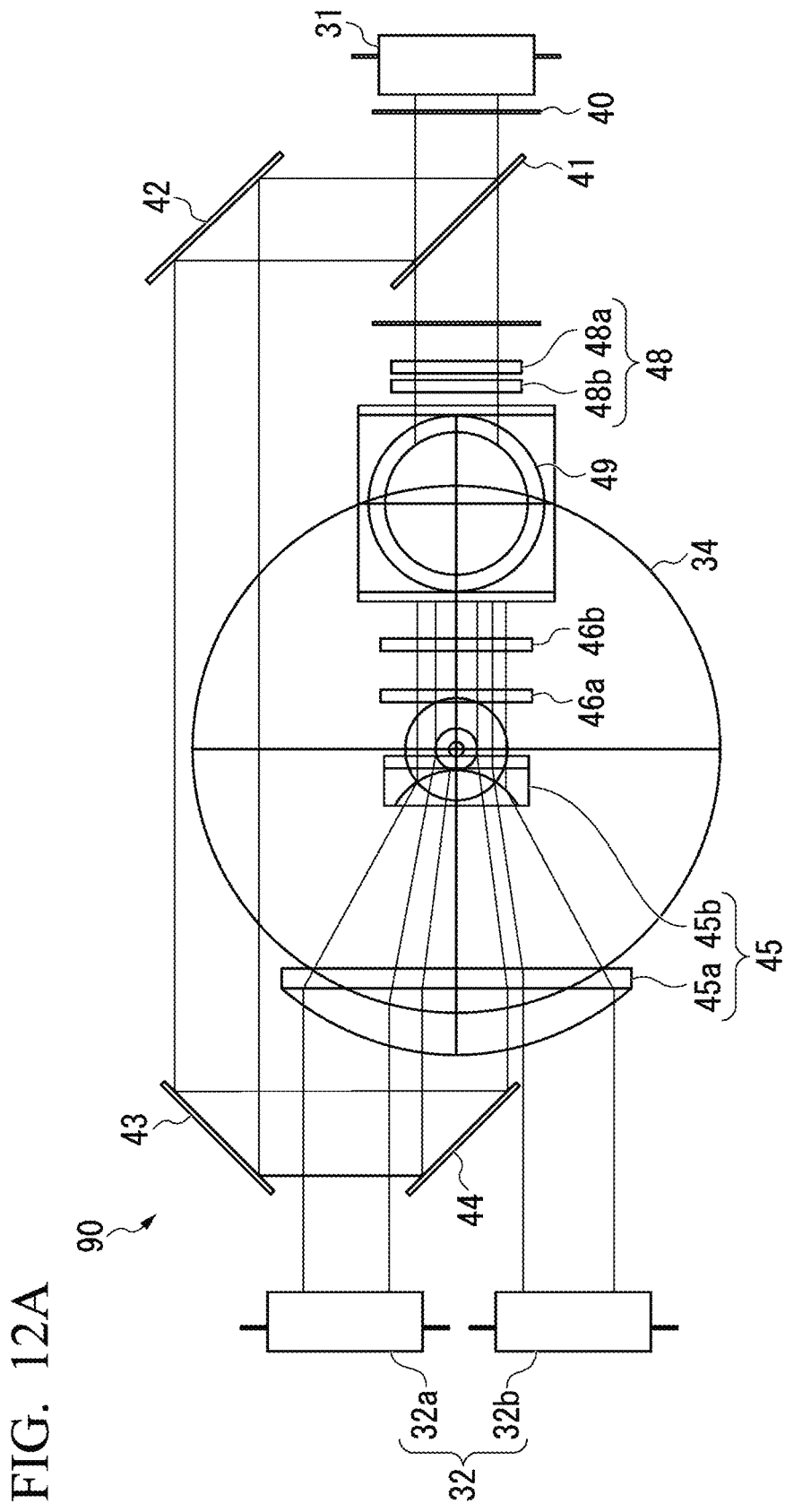
FIG. 12A is a side view of an example of a light source device according to a fourth embodiment.
Figure 12B:
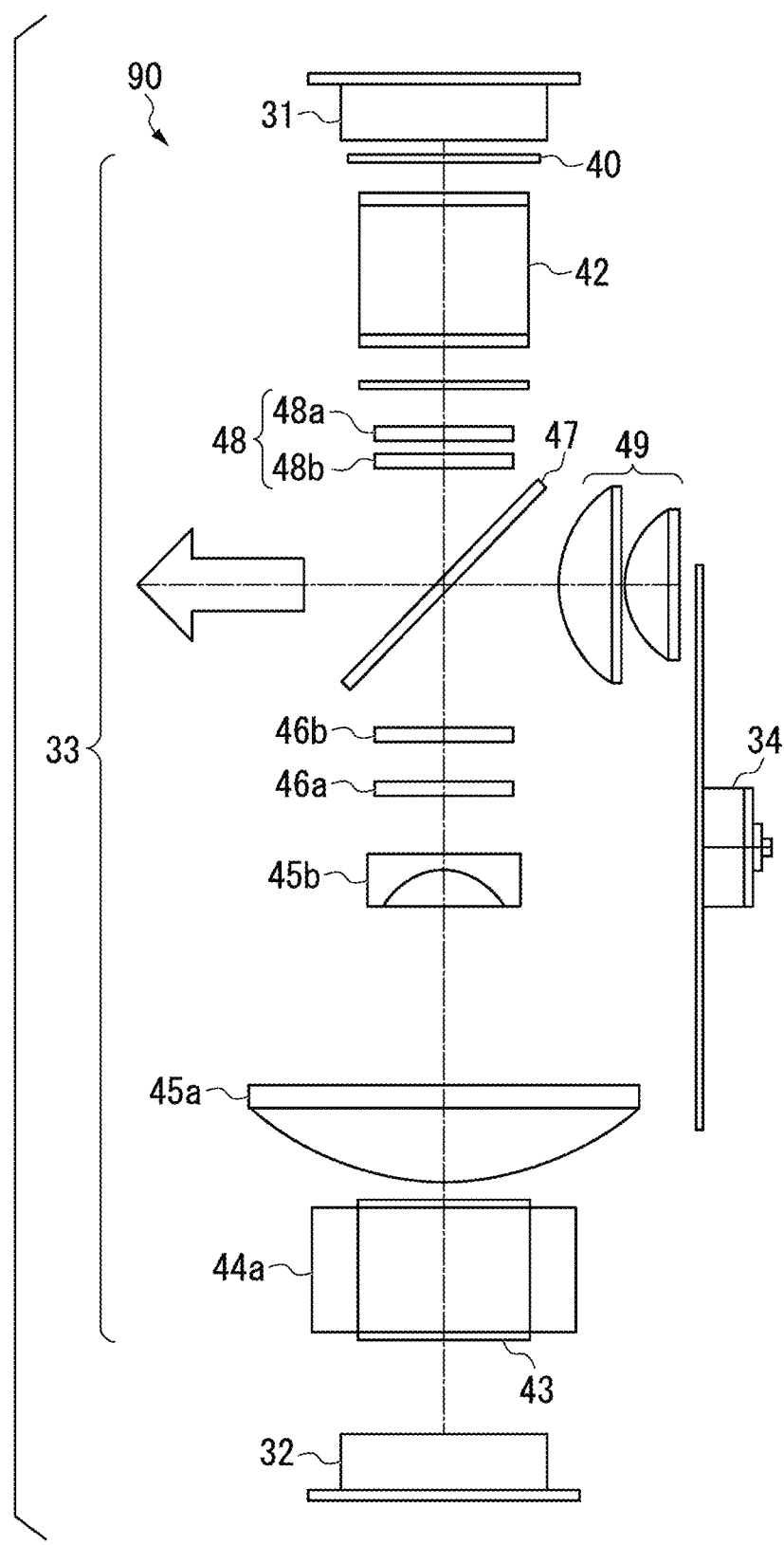
FIG. 12B is a top view of an example of the light source device of the fourth embodiment.

FIGS. 12A and 12B are diagrams schematically showing an example of the light source device 90 according to the fourth embodiment. Specifically, FIG. 12A is a side view of an example of the light source device 90 according to the fourth embodiment, and FIG. 12B is a top view of an example of the light source device 90 according to the fourth embodiment.

In the example shown in FIGS. 12A and 12B, the light source device 90 includes a laser module 31 that functions as a blue light source (a first laser light source), an excitation light source 32, an optical member 33, and a fluorescent substance part 34.

The excitation light source 32 includes two laser modules 32a and 32b. The laser modules 31, 32a, and 32b all have the same configuration, and here, one in which 24 blue LD chips are accommodated in one package is used. The number of blue LD chips in the laser module can be changed as appropriate.

The fluorescent substance part 34 has the same structure as the fluorescent substance part 14 shown in FIG. 9.

The optical member 33 includes a retardation plate 40, a polarization beam splitter 41, mirrors 42, 43, and 44, a reduction optical system 45, fly-eye lenses 46a and 46b, a dichroic mirror 47, a diffusion element 48, and a condenser lens 49.

The blue LD light (the linearly polarized light) emitted by the laser module 31 that functions as the blue light source (the first laser light source) is incident on the polarization beam splitter 41 via the retardation plate 40. Similarly to the retardation plate 20 shown in FIG. 11, the retardation plate 40 is an element that imparts a phase difference to two orthogonal polarized light components to change a state of incident polarized light.

The polarization beam splitter 41 is disposed at an angle of 45 degrees with respect to the optical axis of the blue LD light emitted from the laser module 31, and is configured to reflect the S-polarized light (the first polarized light) and to transmit the P-polarized light (the second polarized light).

The retardation plate 40 and the polarization beam splitter 41 function as a dividing part that divides the blue LD light (the first laser light) emitted by the laser module 31 into the first divided light (the first polarized light, the S-polarized light) and the second divided light (the second polarized light, the P-polarized light).

The S-polarized (the first divided light, the first polarized light) blue LD light reflected by the polarization beam splitter 41 is incident on the mirror 44 via the mirrors 42 and 43.

The mirror 44 is provided in a space that does not block each of the light fluxes in the optical path including the parallel light fluxes emitted from each of the laser modules 32a and 32b. Specifically, as shown in FIG. 12A, the laser modules 32a and 32b are disposed vertically. Each of the laser modules 32a and 32b includes a light emitting part configured of a plurality of LD chips disposed in a matrix and a support part that supports the light-emitting part. Since the support part is larger than the light emitting part, there is a certain amount of space between the laser modules 32a and 32b when the laser modules 32a and 32b are disposed on the same plane. The mirror 44 is formed to have a size that can be disposed in a space between the laser modules 32a and 32b and can reflect the parallel light flux from the laser module 31.

The mirror 44 integrates the S-polarized (the first divided light, the first polarized light) blue LD light from the polarization beam splitter 41 and the blue LD light (the second laser light) emitted from the laser modules 32a and 32b (the second laser light sources) into one optical path.

The integrated light integrated by the mirror 44 is incident on a first surface of the dichroic mirror 47 via the reduction optical system 45 and the fly-eye lenses 46a and 46b. The reduction optical system 45 is configured of a plurality of lenses 45a and 45b that reduce a light flux diameter of the integrated light. The fly-eye lenses 46a and 46b are light homogenizing elements.

The dichroic mirror 47 reflects the integrated light toward the fluorescent substance part 34. The integrated light reflected by the dichroic mirror 47 is incident on the fluorescent substance part 34 via the condenser lens 49.

The yellow fluorescent light emitted by the fluorescent substance part 34 is incident on a first surface of the dichroic mirror 47 via the condenser lens 49.

The P-polarized (the second polarized light, the second divided light) blue LD light that has passed through the polarization beam splitter 41 is incident on a second surface of the dichroic mirror 47 via the diffusion element 48.

The dichroic mirror 47 transmits the yellow fluorescent light incident on the first surface and reflects the blue LD light incident on the second surface in the transmission direction of the yellow fluorescent light. That is, the dichroic mirror 47 color-combines the blue LD light (the second divided light, the P-polarized light, the second polarized light) and the yellow fluorescent light into one optical path. In other words, the dichroic mirror 47 functions as a color light combining part that color-combines the second divided light (the P-polarized light, the second polarized light) and the fluorescent light into one optical path. The light color-combined by the dichroic mirror 47 is the output light (white) of the light source device 90 according to the fourth embodiment.

The diffusion element 48 is disposed on the optical path of the second divided light (the P-polarized light, the second polarized light) between the laser module 31 (the first laser light source) and the dichroic mirror 47 that functions as a color light combining part. That is, the diffusion element 48 diffuses the second divided light (the P-polarized light, the second polarized light).

The diffusion element 48 includes a first lens array 48a disposed on the incidence surface of the diffusion element 48 and a second lens array 48b disposed on the emission surface of the diffusion element 48. A plurality of first lens elements (cells) that divide the P-polarized light (the second polarized light) contained in the first laser light (the blue LD light) emitted by the laser module 31 (the first laser light source) into a plurality of light fluxes are disposed in the first lens array 48a. A plurality of second lens elements (cells) that emit the light fluxes incident through the plurality of first lens elements (cells) toward the image formation plane are disposed in the second lens array 48b.

Similarly to the diffusion element 2 shown in FIG. 3, in the diffusion element 48 shown in FIGS. 12A and 12B, since the optical axis of each of the plurality of second lens elements (cells) of the second lens array 48b is disposed at a position shifted from the optical axis of the light flux incident on each of the plurality of first lens elements (cells) of the first lens array 48a, the plurality of second lens elements (cells) of the second lens array 48b respectively forms light source images having different sizes in different regions on the image formation plane. In another example of the diffusion element 48, all optical axes of the plurality of second lens elements (cells) of the second lens array 48b may not be disposed at the positions shifted from the optical axes of the light fluxes incident on the plurality of first lens elements (cells) of the first lens array 48a.

The light source device 90 according to the fourth embodiment can achieve the same effects as those in the light source device 90 according to the third embodiment.

Any of the light source devices 90 according to the first to fourth embodiments described above can be used as the light source device 90 of a projector PJ. The projector PJ includes light modulation parts 92R, 92G, and 92B that modulate the light emitted from the light source device 90 to form images, and a projection lens 94 that projects the images formed by the light modulation parts 92R, 92G, and 92B.

Fifth Embodiment

A fifth embodiment of the light source device and projector of the present invention will be described below.

The light source device 90 included in the projector PJ according to the fifth embodiment is configured similarly to any one of the light source devices 90 according to the first to fourth embodiments described above. Therefore, according to the projector PJ of the fifth embodiment, the same effects as those in any one of the light source devices 90 according to the above-described first to fourth embodiments can be obtained, except for the points described below.

Figure 13:
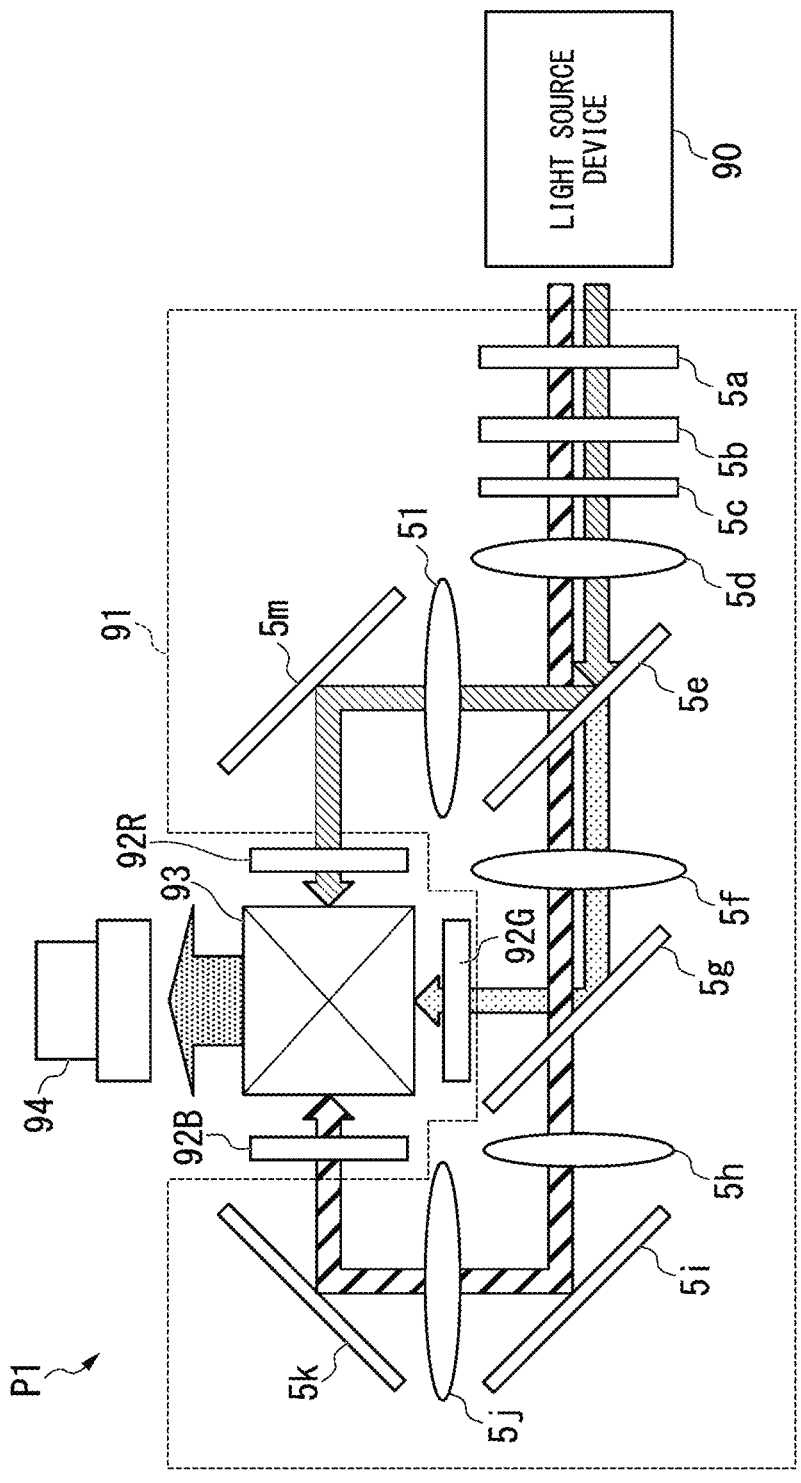
FIG. 13 is a diagram schematically showing an example of a configuration of a projector according to a fifth embodiment.

FIG. 13 is a diagram schematically showing an example of a configuration of the projector PJ according to the fifth embodiment.

In the example shown in FIG. 13, the projector PJ includes a light source device 90, an illumination optical system 91, light modulation parts 92R, 92G, and 92B, a cross dichroic prism 93, and a projection lens 94.

The light source device 90 is configured in the same manner as any one of the light source devices 90 according to the first to fourth embodiments, and emits a parallel light flux which is white light containing yellow fluorescent light and blue LD light.

The illumination optical system 91 separates the white light emitted by the light source device 90 into red light for illuminating the light modulation part 92R, green light for illuminating the light modulation part 92G, and blue light for illuminating the light modulation part 92B. Each of the light modulation parts 92R, 92G, and 92B includes a liquid crystal panel that modulates light to form an image.

The illumination optical system 91 includes fly-eye lenses 5a and 5b, a polarization conversion element 5c, a superimposing lens 5d, dichroic mirrors 5e and 5g, field lenses 5f and 5l, relay lenses 5h and 5j, and mirrors 5i, 5k and 5m. White light emitted from the light source device 90 is incident on the dichroic mirror 5e via the fly-eye lenses 5a and 5b, the polarization conversion element 5c, and the superimposing lens 5d.

The fly-eye lenses 5a and 5b are disposed so as to face each other. Each of the fly-eye lenses 5a and Sb has a plurality of micro-lenses. Each of the micro-lenses of the fly-eye lens 5a faces each of the micro-lenses of the fly-eye lens 5b. The fly-eye lens Sa divides the light emitted from the light source device 90 into a plurality of light fluxes corresponding to the number of micro-lenses. Each of the micro-lens has a shape similar to an effective display region of the liquid crystal panel, and condenses the light fluxes from the light source device 90 to a vicinity of the fly-eye lens 5b.

The superimposing lens 5d and the field lens 5l direct a main light ray from each of the micro-lenses of the fly-eye lens 5a toward the center of the liquid crystal panel of the light modulation part 92R, and superimpose an image of each of the micro-lenses on the liquid crystal panel. Similarly, the superimposing lens 5d and the field lens 5f direct a main light ray from each of the micro-lenses of the fly-eye lens 5a toward the center of the liquid crystal panel of each of the light modulation parts 92G and 92B, and superimpose the images of the micro-lenses on the liquid crystal panel.

The polarization conversion element 5c aligns a polarization direction of the light that has passed through the fly-eye lenses 5a and 5b to P-polarized light or S-polarized light. The dichroic mirror 5e has a property of reflecting light in the red wavelength range and transmitting light in other wavelength ranges in visible wavelengths.

The light (red) reflected by the dichroic mirror 5e is radiated to the liquid crystal panel of the light modulation part 92R via the field lens 5l and the mirror 5m. On the other hand, the light (blue and green) transmitted through the dichroic mirror 5e is incident on the dichroic mirror 5g via the field lens 5f. The dichroic mirror 5g has a property of reflecting light in the green wavelength range and transmitting light in other wavelength ranges in visible wavelengths.

The light (green) reflected by the dichroic mirror 5g radiated to the liquid crystal panel of the light modulation part 92G. On the other hand, the light (blue) transmitted through the dichroic mirror 5g is radiated to the liquid crystal panel of the light modulation part 92B via the relay lens 5h, the mirror 5i, the relay lens 5j and the mirror 5k.

The light modulation part 92R forms a red image. The light modulation part 92G forms a green image. The light modulation part 92B forms a blue image. The cross dichroic prism 93 has first to third incidence surfaces and an emission surface. In the cross dichroic prism 93, the red image light is incident on the first incidence surface, the green image light is incident on the second incidence surface, and the blue image light is incident on the third incidence surface. Red image light, green image light, and blue image light are emitted from the emission surface along the same optical path.

The red image light, the green image light and the blue image light emitted from the emission surface of the cross dichroic prism 93 are incident on the projection lens 94. The projection lens 94 superimposes the red, green and blue images and projects them onto the screen.

The light source device 90 of the projector PJ according to the fifth embodiment is configured in the same manner as any one of the light source devices 90 according to the first to fourth embodiments, and includes the diffusion element (2, 28, 48) for reducing the speckle noise.

As described above, although the mode for implementing the present invention has been described using the embodiments, the present invention is by no means limited to the embodiments, and various modifications and replacements can be made without departing from the gist of the present invention. The configurations described in each of the embodiments and each of the examples described above may be combined suitably.

REFERENCE SIGNS LIST

1 Laser light source
1a Laser light
1b Light source image
2 Diffusion element
2a, 2b Lens array
2aA, 2aB, 2aC, 2aD, 2bA, 2bB, 2bC, 2bD Lens element
2c Light source image
A, B Position
θ Diffusion angle
11 Blue light source
12 Excitation light source
13 Optical member
20 Retardation plate
21 Polarization beam splitter
22, 23 Mirror
24 Light integration part
25 Reduction optical system
26a, 26b Fly-eye lens
27 Dichroic mirror
28 Diffusion element
28a, 28b Lens array
29 Condenser lens
14 Fluorescent substance part
31 Laser module
32 Excitation light source
32a, 32b Laser module
33 Optical member
34 Fluorescent substance part
40 Retardation plate
41 Polarization beam splitter
42, 43, 44 Mirror
45 Reduction optical system
45a, 45b Lens
46a, 46b Fly-eye lens
47 Dichroic mirror
48 Diffusion element
48a, 48b Lens array
49 Condenser lens
PJ Projector
90 Light source device
91 Illumination optical system
5a, 5b Fly-eye lens
5c Polarization conversion element
5d Superimposing lens
5e, 5g Dichroic mirror
5f, 5l Field lens
5h, 5j Relay lens
5i, 5k, 5m Mirror
92R, 92G, 92B Light modulation part 93 Cross dichroic prism
94 Projection lens

The invention claimed is:

1. A light source device comprising:
a first laser light source which emits first laser light;
a second laser light source which emits second laser light;
a dividing part which divides the first laser light into first divided light and second divided light;
a light integration part which integrates the first divided light and the second laser light into one optical path;
a fluorescent substance part which receives the light integrated by the light integration part and emits fluorescent light;
a color light combining part which color-combines the second divided light and the fluorescent light into one optical path; and
a diffusion element which is provided on an optical path of the first laser light and diffuses the light,
wherein the diffusion element comprises:
a first lens array in which a plurality of first lens elements that divide the first laser light into a plurality of light fluxes are arranged; and
a second lens array in which a plurality of second lens elements that emit the light fluxes incident via the plurality of first lens elements toward an image formation plane are arranged,
wherein the first lens array is disposed on an incidence surface of the diffusion element,
wherein the second lens array is disposed on an emission surface of the diffusion element,
wherein at least two second lens elements among the plurality of second lens elements form light source images having different sizes in different regions on the image formation plane, and
wherein the diffusion element is disposed on an optical path of the second divided light between the first laser light source and the color light combining part.

2. The light source device according to claim 1,
wherein the first laser light incident on the plurality of first lens elements is a parallel light flux, and optical axes of some of the second lens elements of the at least two second lens elements are disposed at a position shifted from an optical axis of the light flux incident on the first lens element corresponding to the some of the second lens elements such that the at least two second lens elements form light source images having different sizes in different regions on the image formation plane.

3. The light source device according to claim 1, wherein:
the fluorescent substance part receives the second laser light and emits fluorescent light; and
the color light combining part color-combines the first laser light and the fluorescent light into one optical path.

4. The light source device according to claim 3, the light source device further comprising:
a condenser lens which condenses the second laser light onto an irradiation surface of the fluorescent substance part and converts the fluorescent light from the fluorescent substance part into pseudo parallel light,
wherein the condenser lens is disposed between the fluorescent substance part and the color light combining part.

5. The light source device according to claim 1, the light source device further comprising:
a condenser lens which condenses the light integrated by the light integration part onto an irradiation surface of the fluorescent substance part and converts the fluorescent light from the fluorescent substance part into pseudo parallel light,
wherein the condenser lens is disposed between the fluorescent substance part and the color light combining part.

6. The light source device according to claim 1,
wherein the dividing part comprises:
a retardation plate which imparts a phase difference to two orthogonal polarized light components included in the first laser light to change a state of incident polarized light, and passes first polarized light as the first divided light and second polarized light as the second divided light, and
a polarizing beam splitter which reflects the first polarized light and transmits the second polarized light, and
wherein the diffusion element diffuses the second polarized light.

7. A projector comprising:
the light source device according to claim 1;
a light modulation part which modulates the light emitted from the light source device to form an image; and
a projection lens which projects the image.

* * * * *